United States Patent [19]
Kump et al.

[11] Patent Number: 5,512,065
[45] Date of Patent: Apr. 30, 1996

[54] METHODS FOR ASSEMBLING LEAD-ACID BATTERIES

[75] Inventors: William H. Kump, St. Paul; James K. Klang, Rosemount; David L. Lund, Minneapolis; Jeffrey M. Henning, Eagan, all of Minn.

[73] Assignee: GNB Battery Technologies Inc., Mendota Heights, Minn.

[21] Appl. No.: 135,053

[22] Filed: Oct. 12, 1993

[51] Int. Cl.$^6$ .................................................. H01M 10/14
[52] U.S. Cl. .................... 29/623.1; 29/623.5; 429/154; 429/160; 429/163
[58] Field of Search .................. 29/623.1, 623.5; 429/154, 160, 161, 163

[56] References Cited

U.S. PATENT DOCUMENTS

| | | | |
|---|---|---|---|
| 636,142 | 10/1899 | Hodgson . | |
| 693,676 | 2/1902 | Willis . | |
| 741,592 | 10/1903 | Roberts . | |
| 1,432,938 | 10/1922 | Wood et al. . | |
| 1,879,562 | 9/1932 | Smith . | |
| 1,942,668 | 1/1934 | Smith | 136/145 |
| 2,578,534 | 12/1951 | Giles et al. | 136/146 |
| 3,085,126 | 4/1963 | Labino | 136/146 |
| 3,272,656 | 9/1966 | Corbin et al. | 136/145 |
| 3,726,117 | 4/1973 | Zaleski | 136/111 |
| 3,918,995 | 11/1975 | Palmer et al. | 136/145 |
| 3,941,615 | 3/1976 | McDowall | 136/38 |
| 4,022,951 | 5/1977 | McDowall | 429/149 |
| 4,209,575 | 6/1980 | McDowall et al. | 429/146 |
| 4,216,280 | 8/1980 | Kono et al. | 429/247 |
| 4,239,839 | 12/1980 | McDowall et al. | 429/154 |
| 4,317,872 | 3/1982 | Varma | 429/190 |
| 4,336,314 | 6/1982 | Yonezu et al. | 429/66 |
| 4,367,271 | 1/1983 | Hasegawa et al. | 429/252 |
| 4,421,834 | 12/1983 | Zupancic | 429/105 |
| 4,465,748 | 8/1984 | Harris | 429/247 |
| 4,615,958 | 10/1986 | Golz | 429/127 |
| 4,648,177 | 3/1987 | Uba et al. | 29/623.2 |
| 5,035,045 | 7/1991 | Bowen et al. | 29/623.2 |
| 5,068,160 | 11/1991 | Clough et al. | 429/72 |
| 5,091,275 | 2/1992 | Brecht et al. | 429/247 |
| 5,158,844 | 10/1992 | Hagens et al. | 429/249 |
| 5,240,468 | 8/1993 | Willmann et al. | 29/623.5 |

FOREIGN PATENT DOCUMENTS

| | | |
|---|---|---|
| 0334091A1 | 9/1989 | Germany . |
| GB80/00159 | 10/1980 | WIPO . |

OTHER PUBLICATIONS

Comparison of Recombinant Lead Acid Battery Technologies, by William B. Brecht and Norman F. O'Leary (month n/a) 1990.

Primary Examiner—M. Nuzzolillo
Attorney, Agent, or Firm—Leydig, Voit & Mayer, Ltd.

[57] ABSTRACT

A method of fabricating a modular, recombinant lead-acid battery is provided for. The method includes providing a plurality of thermoplastic frames, including at least two frames which support electrochemically active plates. The frames are adapted to be stacked and welded together such that the plates are spaced apart from each other a predetermined distance. One or more separators also are provided. The separators have an uncompressed state in which their thickness is equal to or greater than the predetermined distance between plates and a compressed state. The frames and separators are stacked such that a separator is disposed between adjacent plates in its compressed state. The frames then are successively vibration welded together, again while the separator is in its compressed state. The separator has a predetermined thickness in its compressed state effective to reduce damage to the separator caused by abrasion of the separators by the plates during vibration welding. The separator also tends to assume its uncompressed state in the presence of electrolyte so that the separator contacts the plates upon completion of the battery.

23 Claims, 5 Drawing Sheets

METHODS FOR ASSEMBLING LEAD-ACID BATTERIES

FIELD OF THE INVENTION

This invention relates to methods for assembling lead-acid electric storage batteries, and especially, to methods for fabricating modular lead-acid storage batteries using vibrational welding to join the thermoplastic frames incorporated therein.

BACKGROUND OF THE INVENTION

Modular multi-cell batteries represent a total departure from traditional designs for SLI automotive lead-acid batteries. Traditional designs incorporate a premolded container divided into individual cell compartments. Battery plates and separators are separately formed and assembled and then are inserted into the cell compartments during assembly of the battery.

Modular battery designs, such as those disclosed in U.S. patent application Ser. No. 762,814, filed Sep. 17, 1991 (to be issued on Oct. 26, 1993 as U.S. Pat. No. 5,256,502), U.S. Pat. No. 5,068,160 to T. Clough et al., U.S. Pat. Nos. 4,239,839 and 4,209,579 to W. McDowell and U.S. Pat. Nos. 4,022,951 and 3,941,615 to W. McDowell, however, do not have a premolded container. Instead, the container, such as it is, is formed by joining together a collection of thermoplastic frames.

More specifically, modular lead-acid batteries are fabricated from a plurality of relatively thin, generally rectangular, prefabricated thermoplastic frames. Some frames support electrochemically active battery plates and, in some designs, other frames support separator material. During assembly of the battery, the frames are stacked and joined together to create an assembly of alternating plate frames and separator frames sandwiched between two end frames. In their joined state, the collection of frames constitutes an electrolyte-tight container.

In some designs, the frames include a number of partition ribs which extend across the peripheral members of the frames. When a battery is assembled from the frames, the peripheral members of the frames are joined together to form the battery container. The partition ribs are joined together to form dividers which define a plurality of cells between adjacent plate-supporting frames.

It is possible to join an entire stack of frames together at the same time in a single induction or conduction heat-sealing operation. Such methods, however, require that the frames incorporate a metallic conductor or inductor near the sealing area of the frame, a feature which makes the frame much more expensive. As a practical matter, therefore, modular frames having partition ribs and the like which will form cell dividers in a finished battery must be joined together sequentially. That is, two frames must be sealed together, a third sealed to the first two, a fourth sealed to the first three, and so on.

There are a number of general techniques for sequentially joining modular battery frames, such as heat-sealing with, for example, a hot-plate or focused infra-red radiation. A relatively large amount of plastic is melted, however, in heat-sealing processes. Thus, there is a relatively long cooling period during which pieces must be allowed to set, and heat-sealing modular battery frames sequentially is relatively slow.

The frames also may be joined together with solvents or adhesives, such as epoxy, hot-melt and other electrolyte-insensitive solvents and adhesives traditionally used in manufacturing batteries. Modular batteries, however, require extensive sealing. For example, a modular battery might incorporate from about 10 to about 70 or more frames. Laying down beads of solvent or adhesive to form all the necessary seals is relatively slow, and the adhesive or solvent itself usually is relatively expensive and harmful to the environment.

Ultrasonic welding is another option. Given the size of the typical modular frame, however, ultrasonic horns used to perform such operations must be larger and have higher energies, and horns of sufficient size and energy are not durable enough for use in mass assembly of batteries.

Yet another method involves vibrationally welding the frames together. In such methods, for example, two frames are placed next to each other and lightly pressed together. One of the frames is fixed and the other is mechanically vibrated linearly or orbitally in the plane in which the frames contact each other. The vibration causes plastic at the interface between the frames to melt and, upon cooling, to form a weld between the frames. Thereafter, additional frames are vibration welded in turn to the accumulating stack of welded frames until the frame assembly is completed.

Vibrational welding in general can reliably and efficiently join frames into a leak-tight container having a number of dividers. There is a very short cooling period, and thus, vibrational welding is faster than sequential heat sealing methods. Vibrational welding also is faster and cheaper than using adhesives. Accordingly, vibrational welding has been used successfully in the manufacture of flooded modular batteries.

Applicants have observed, however, that recombinant modular batteries assembled by vibrational welding methods exhibit short circuiting. That short circuiting is believed to be caused by damage to the separator which occurs during vibration welding. That is, the electrochemistry of oxygen-recombinant, valve-regulated batteries necessitates certain modification of the separator as compared to the separators in flooded batteries. In flooded batteries, the separator is relatively thin, and ideally it does not contact the surface of the active plates.

In recombinant batteries, however, there must be firm contact between a separator and the surface of a battery plate, as this contact aids in transporting oxygen from the positive plate to the negative plate for recombination and ensures efficient electrochemical communication between the plates and electrolyte.

In recombinant batteries having a traditional design, intimate contact is achieved by oversizing the separator somewhat relative to the distance which will separate the plates in a finished battery. During assembly, the oversized separators are disposed between a series of plates, and the plates are squeezed together, welded to a strap, and placed in the battery container, such that the separator is compressed in the finished battery. The compressed, oversized separator provides a certain amount of pressure which forces the separator into intimate contact with the surface of the plates.

In attempting to use vibrational welding methods to assemble recombinant modular batteries, however, applicants have observed that the contact between a oversized separator and plate can result in severe damage to the separator material and embedding of electrochemically active paste in the separator. This in turn, can lead to short circuiting of the cell.

An object of the subject invention, therefore, is to provide a method of assembling a modular lead-acid battery which is reliable and economical and which is faster than sequentially bonding frames together by heat sealing or with adhesives. A related and more specific object is to provide a method of assembling modular batteries, including recombinant modular batteries having cell dividers, by vibrationally welding frames together without damaging the separator.

Those and other objects and advantages of the invention will be apparent to those skilled in the art upon reading the following detailed description and upon reference to the drawings.

SUMMARY OF THE INVENTION

The subject invention provides for a method of fabricating a modular, recombinant lead-acid battery. The method includes providing a plurality of thermoplastic frames, including at least two frames which support electrochemically active plates. The frames are adapted to be stacked and welded together such that the plates are spaced apart from each other a predetermined distance. One or more separators also are provided. The separators have an uncompressed state, in which their thickness is equal to or greater than the predetermined distance between plates, and a compressed state.

The frames and separators are stacked such that a separator is disposed between adjacent plates in its compressed state. The frames then are successively vibration welded together, again while the separator is in its compressed state.

The separator has a predetermined thickness in its compressed state effective to reduce abrasion of the separators by the plates during vibration welding. The separator also tends to assume its uncompressed state in the presence of electrolyte so that the separator contacts the plates in a finished battery.

The invention also provides for methods wherein the separator is maintained in its compressed state by a releasable binder, preferably, an electrolyte-sensitive binder.

It will be appreciated, therefore, that the subject invention provides an efficient and economic method for assembling a modular recombinant lead-acid battery. Importantly, because the uncompressed and compressed thickness of the separator are selected as described above, contact between the separator and plates is established in a completed battery, but damage which otherwise might occur during vibration welding is avoided. Further, the novel methods may be used even when the modular frames have partition ribs which must be welded to form cell dividers.

DETAILED DESCRIPTION OF THE INVENTION

Figure 1:
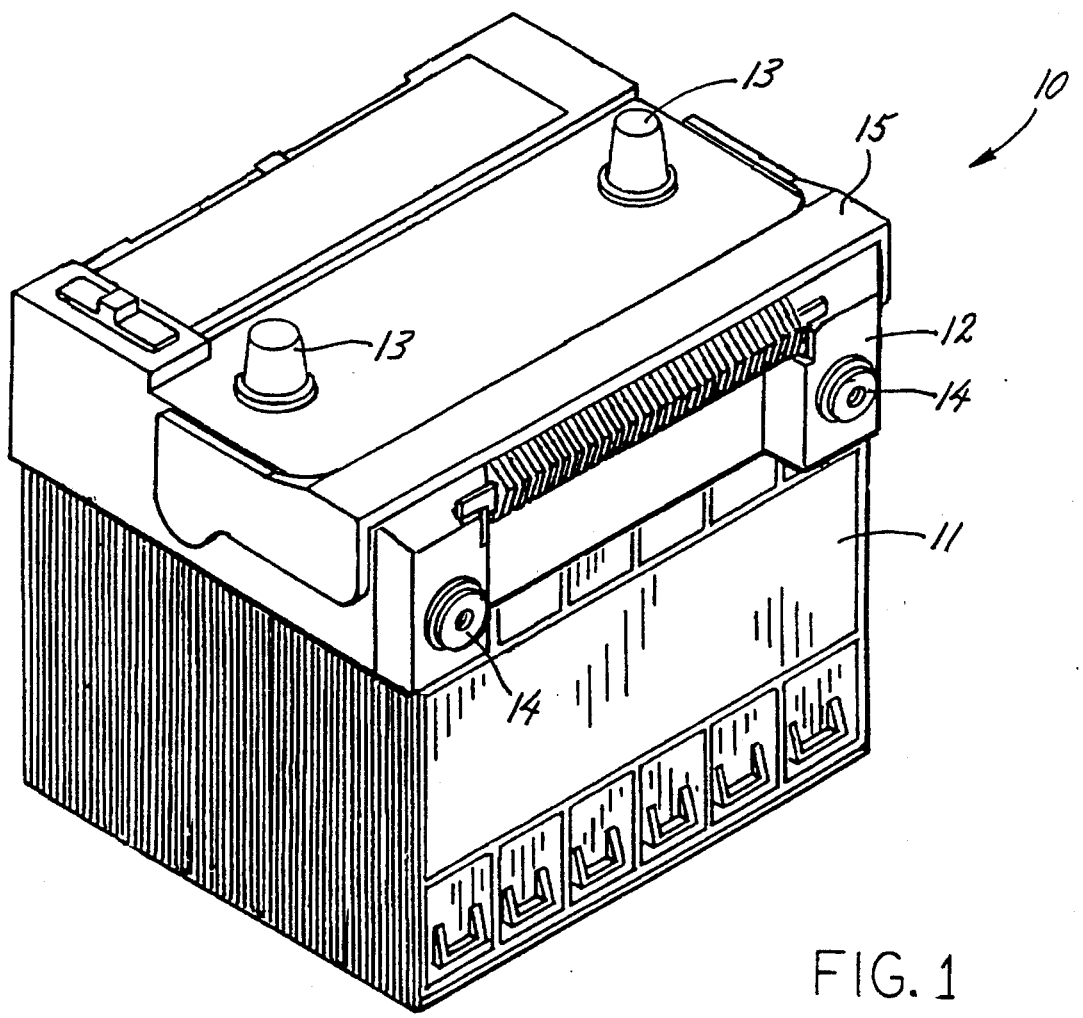
FIG. 1 is a perspective view of a modular lead-acid storage battery which may be assembled by methods of the subject invention, showing in particular the general features of such modular batteries.

FIG. 1 shows a modular, multi-cell battery which may be manufactured by the methods of the subject invention. As can be seen therein, the battery 10 comprises a generally solid-rectangular shaped container 11 and a cover 12. A pair of top terminals 13 and a pair of side terminals 14 project through the cover 12 and are electrically connected by suitable busbars and connections (not shown) to the internal cells of the battery 10. The battery 10 also is provided with a handle 15.

Certain aspects of the illustrated battery 10 will be discussed in further detail below. The design of the battery 10, however, is substantially as disclosed in the above referenced '814 application, except that in order to explain the full benefits derived from the assembly methods of the subject invention, the battery 10 is adapted to utilize a recombinant lead-acid electrochemistry. Accordingly, the battery 10 incorporates a suitable pressure release system (not shown), and a variety of such systems are known to workers in the art and may be incorporated into batteries manufactured by the methods disclosed herein. Other details of the design which are common to recombinant and flooded lead-acid chemistries, as well as modifications thereto, are disclosed in the '814 application, and the disclosure of that application is incorporated herein by reference.

The battery 10 has various advantages over other modular battery designs, as disclosed in the '814 application, and it is a preferred design for such reasons. It will be appreciated, however, that the subject invention is suitable for manufacturing a wide variety of modular batteries. For example, the subject invention may be used to fabricate recombinant bipolar modular batteries.

Figure 2:
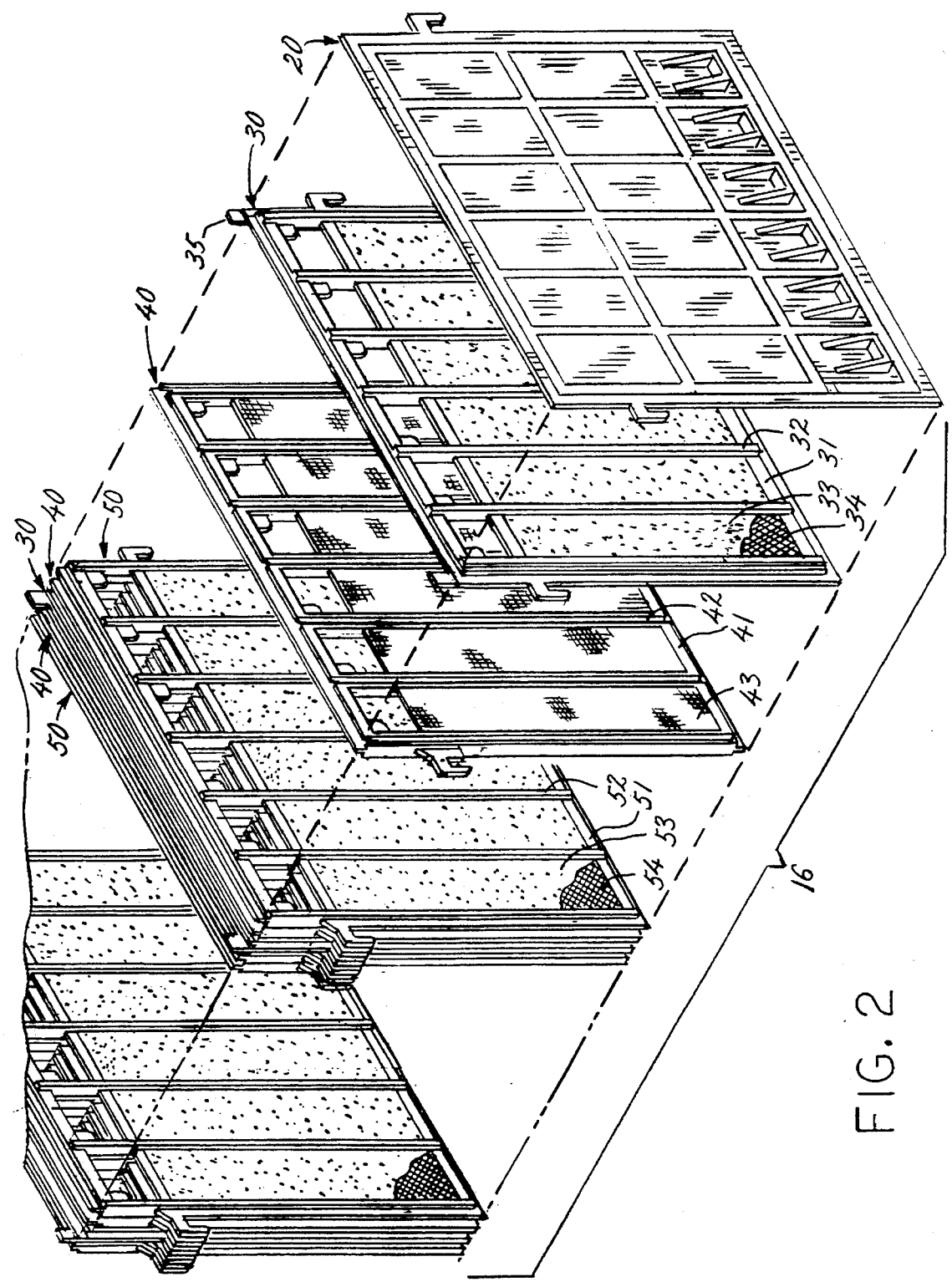
FIG. 2 is a partially exploded, perspective view of a subassembly of the modular lead-acid storage battery shown in FIG. 1, showing a collection of modular frames which have been welded together using the methods of the subject invention.

The subject invention provides a method of fabricating a battery from a plurality of modular frames which are configured to provide a desirable welding surface when the frames are placed together. In accordance therewith, as shown in FIG. 2, the illustrative battery 10 includes a frame assembly The frame assembly 16 includes a pair of end frames seven terminal plate frames 30, thirteen separator frames 40, and seven floater plate frames 50 (not all of which are shown). The frames 20, 30, 40, 50 are arranged in the following sequence: (1) an end frame 20; (2) a terminal plate frame 30, a separator frame 40, a floater plate frame 50, and a separator frame 40 repeated in sequence six times; and (3) another terminal plate frame 20, another separator frame 30, another floater plate frame 50, and another end frame 20; such that the frame assembly 16 is composed of a total of 29 frames. The frames 20, 30, 40, 50 are vibrationally welded together such that the frame assembly 16 defines the container 11 as well as a plurality of internal cells, all of which will be explained in greater detail below.

Consistent therewith, the frames 20, 30, 40, 50 are composed of a thermoplastic material, and a variety of such materials are known to be suitable for use in batteries and may be used in the subject invention. Such materials include unfilled or glass-filled polypropylene homopolymers and copolymers, polyethylene, polyphenylene ethers, polyphenylene sulfides, acrylonitrile-butadinestyrene copolymers, polyvinyl chloride, and acrylics. Indeed, any thermoplastic material may be used which provides sufficient strength, stiffness, resistance to acid and to oxidation, and compatibility in the lead-acid environment and which is susceptible to vibration welding.

Figure 3:
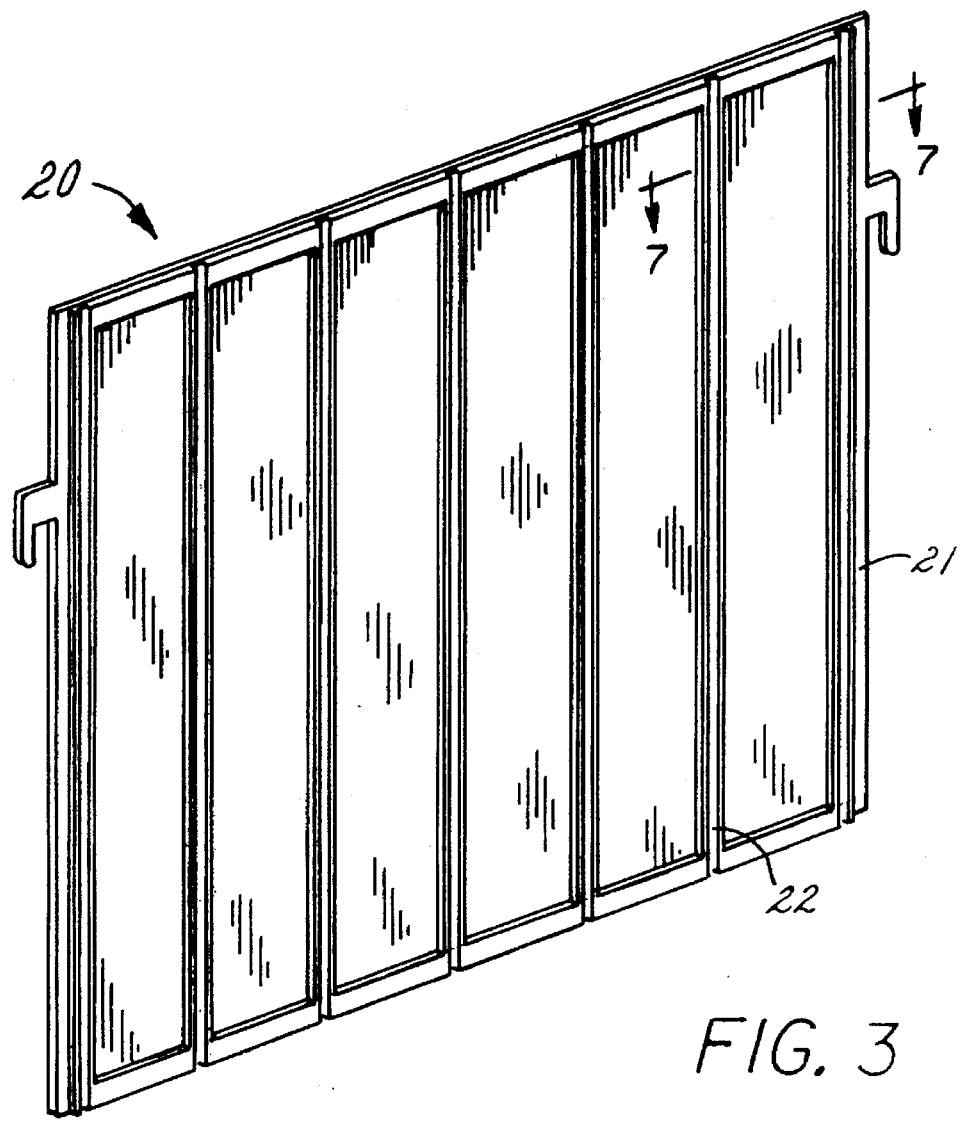
FIG. 3 is a perspective view of an end frame forming part of the subassembly shown in FIG. 2.

The end frames 20 are adapted to provide end walls of the container 11. Thus, as shown in FIGS. 2 and 3, the end frame 20 is a generally rectangular plate. The peripheral areas 21 of the end frame 20, as shown in FIG. 3, are somewhat enlarged. The vertical peripheral areas 21 define grooves. The end frame 20 also has five partition ribs 22 which extend vertically along the inner surface of the end frame 20 and which also define vertical grooves. The grooves aid in assembling and welding the frame assembly 16 by cooperating with tongues in adjacent frames as described in further detail below.

Figure 4:
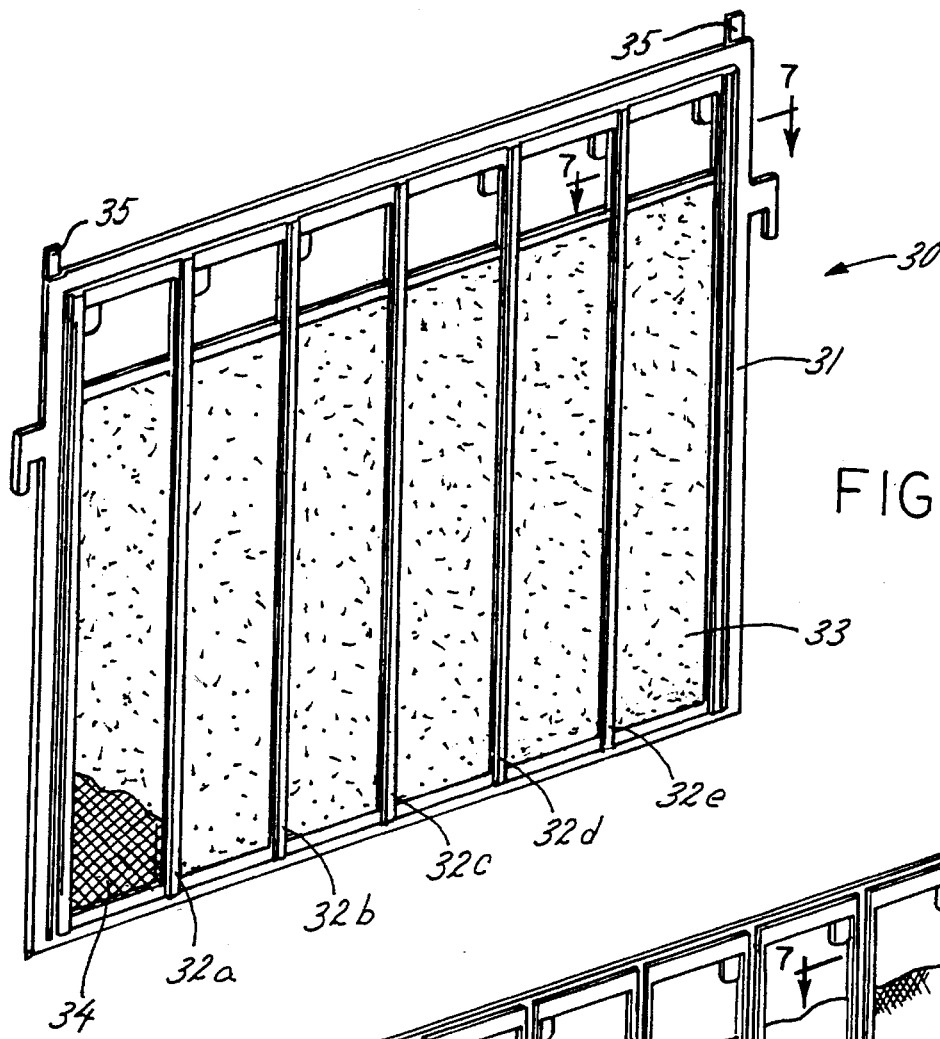
FIG. 4 is a perspective view of a terminal plate frame forming part of the subassembly shown in FIG. 2.

The terminal plate frames 30 are adapted to support one or more electrochemically-active plates which ultimately are connected to the battery terminals. In the illustrative battery 10, as can be seen best in FIGS. 2 and 4, the terminal plate frame 30 includes a generally open, rectangular frame structure having four peripheral members 31. The terminal plate frame 30 also has five partition ribs 32 which extend vertically between the two horizontal peripheral members 31. The vertical peripheral members 31 and partition ribs 32 are provided with projecting tongues which cooperate with grooves in adjacent frames to facilitate fabrication of the frame assembly 16.

Each terminal plate 30 in the illustrative battery 10 supports six electrochemically active plates 33, three positive plates and three negative plates. The plates comprise a lead-alloy mesh 34 which serves as a current collector and which is supported in the frame 30. The mesh 34 extends through partition ribs 32*b* and 32*d*, but does not extend through partition ribs 32*a*, 32*c*, and 32*e*. The mesh is connected (not shown) to a pair of terminal tabs 35. The terminal tabs 35 provide electrical connection between the mesh 34 and busbars (not shown) and ultimately to the terminals 13, 14. The mesh 34 is covered with a suitable electrochemically active paste to complete the plates 33.

It will be appreciated, however, that the precise construction of the plates is a matter of preference. A wide variety of plate configurations, current collectors, and electrochemically-active pastes are known to workers in the art and may be used to advantage in the subject invention. For example, the plate frames may be configured to support more or less than the six plates of a quasi-bipolar configuration such as that discussed above. The plate frames also may support one or more bipolar plates, in which configuration the mesh collector would be replaced with a continuous current collector.

Figure 5:
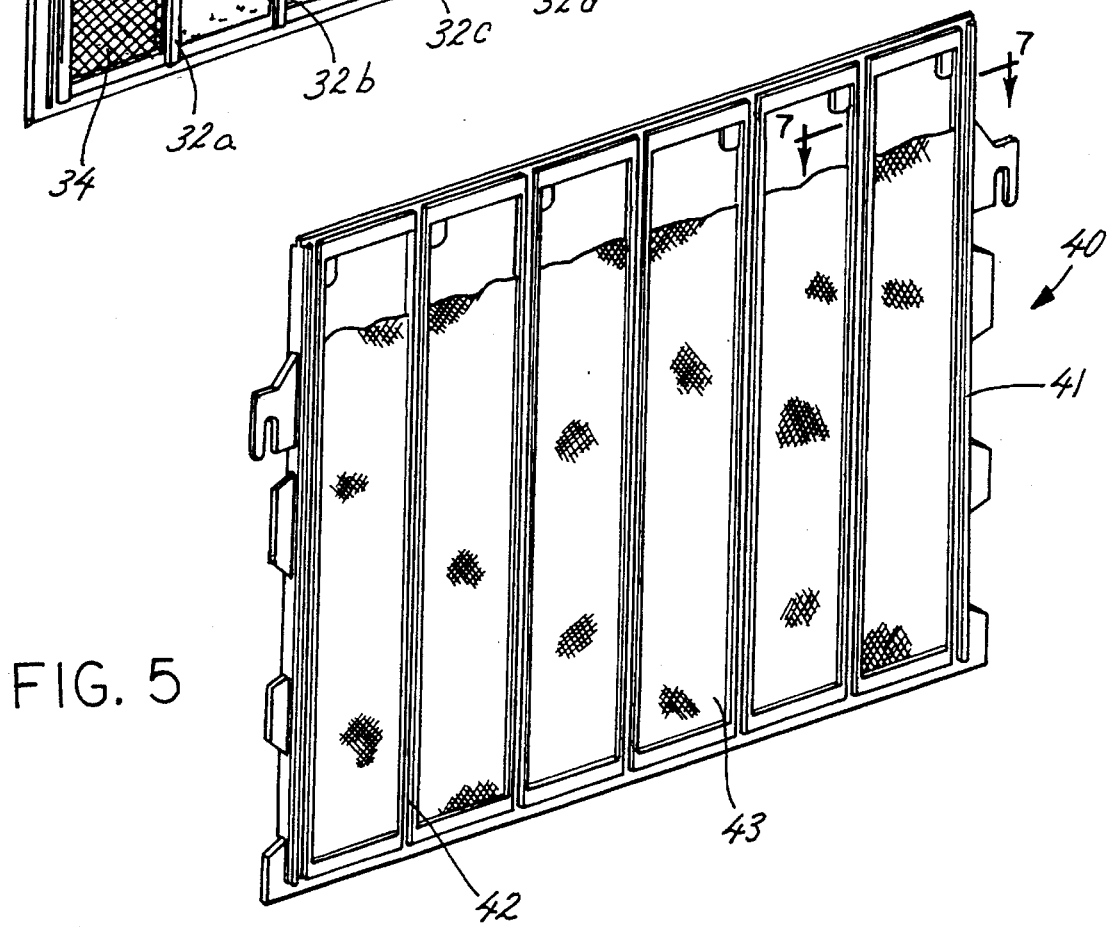
FIG. 5 is a perspective view of a separator frame forming part of the subassembly shown in FIG. 2.

The separator frames 40 are adapted to support a sheet of separator material between adjacent plates. Accordingly, in the illustrative battery 10, as can be seen best in FIGS. 2 and 5, the separator frame 40 includes a generally open, rectangular frame structure having four peripheral members 41. The separator frame 40 also has five partition ribs 42 which extend vertically between the two horizontal peripheral members 41. The vertical peripheral members 41 and partition ribs 42 define grooves which cooperate with tongues in adjacent frames to facilitate fabrication of the frame assembly 16.

Each separator frame 40 supports a separator 43 which, in general, is adapted to provide electrochemical communication between the plates but to prevent the plates from directly contacting each other. The separator, in accordance with an important feature of the subject invention, also is selected and processed such that it has a compressed state and an uncompressed state. Consequently, as will be described in greater detail below, the frames may be vibrationally welded together without damage to the separator.

Figure 6:
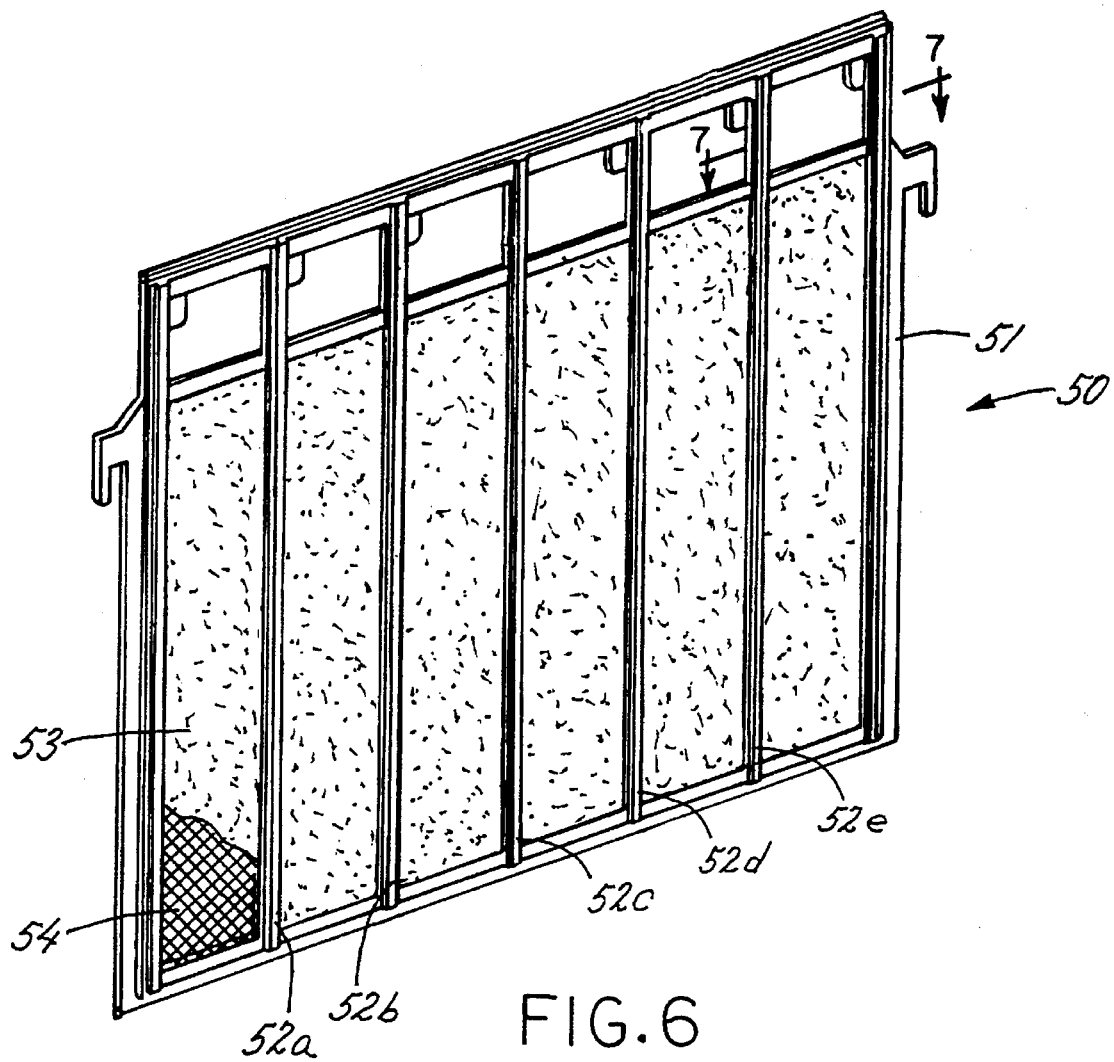
FIG. 6 is a perspective view of a floater plate frame forming part of the subassembly shown in FIG. 2.

The floater plate frames 50 are adapted to support one or more electrochemically-active plates. The floater plate frames 50 in the illustrative battery 10 are constructed in substantially the same manner as are the terminal plate frames 30, except that the floater plate frames 50 do not have terminal tabs, such as the terminal tabs 35 of the terminal plate frames 30. More specifically, as can be seen best in FIGS. 2 and 6, each floater plate frame 50 includes a generally open, rectangular frame structure having four peripheral members 51. The floater plate frame 50 also has five partition ribs 52 which extend vertically between the two horizontal peripheral members 51. The vertical peripheral members 51 and partition ribs 52 are provided with projecting tongues which cooperate with grooves in adjacent frames to facilitate fabrication of the frame assembly 16.

Each floater plate frame 50 supports six electrochemically active plates 53 comprising a mesh current collector 54 covered with electrochemically active paste. The mesh 54 extends through partition ribs 52*a*, 52*c*, and 52*e*. As with the terminal plate frames 30, however, the specific plate configuration, current collectors, and active paste material in the floater plate frames 50 are a matter of design choice.

In general, recombinant modular batteries may be assembled by sequentially vibrationally welding a predetermined array of the frames 20, 30, 40, 50 in a predetermined sequence. It will be appreciated, however, that the precise number, configuration, and sequence of frames can be varied depending on the design criteria for the modular battery. For example, the battery may incorporate a greater or lesser number of frames and the frames may have a greater or lesser number of partition ribs. The subject invention may be used to fabricate modular batteries of varying designs.

In the illustrative battery 10, for example, an end frame 20 is first vibrationally welded to a terminal plate frame 30, the grooves in the end frame 20 and the tongues in the terminal plate frame 30 assisting in orienting the frames and facilitating the weld. The tongues and grooves may be of any shape consistent with that purpose, and such tongues and grooves or their equivalent preferably are provided in adjoining frames. It will be appreciated, however, that the adjoining surfaces of adjacent frames may be flat or have any other geometry conducive to vibrational welding.

A separator frame 40 then is vibrationally welded to the previously welded frames 20, 30; a floater plate frame 40 is vibrationally welded to the previously welded frames 20, 30, 40; a separator frame 40 is vibrationally welded to the previously welded frames 20, 30, 40, 50; and so on until the entire array of frames is welded together to form the frame subassembly 16. In this welded state, the two ends of the container 11 are formed from the end plates 20. The two sides and bottom of the container 11 are formed from the peripheral members 21, 31, 41, 51 of the frames 20, 30, 40, 50. The partition ribs 22, 32, 42, 52 of the frames 20, 30, 40, 50 form dividers within the container which, together with the plates 33, 53, define a plurality of cells in which there are a pair of plates 33, 53 of opposing polarity separated by a separator 43.

After the frame subassembly 16 has been completed, electrolyte fill holes then may be drilled into the top of the frame subassembly 16 so that there is an electrolyte fill hole for each cell. Alternately, the frames may be provided with suitable cut-away portions so that, upon completion of the frame subassembly, electrolyte fill holes are provided therein. Thereafter, the terminal connections may be formed and electrolyte added to each cell. A cover having suitable terminals and a pressure-release system then is provided, the pressure-release system communicating with the electrolyte fill holes. Other components, such as handles, also may be provided. Other methods of finishing the frame subassembly into a completed battery are known, however, and may be used.

In accordance with an important aspect of the subject invention, the frames are adapted such that the electrochemically-active plates are supported and spaced apart relative to each other a predetermined distance. The separator is sized such that its thickness is equal to or greater than the predetermined distance between the plates. Thus, it will be appreciated that in a completed battery the oversized separator will intimately contact the plates as is required for a recombinant battery. If the separator were vibrationally welded under such conditions, however, damage to the separator is very likely to occur.

That is, battery separator material is relatively fragile. When a separator is in contact with an adjacent plate during vibrational welding, it is abraded against the plate. This abrasion can damage the separator, causing thin spots which reduce the degree of physical separation which otherwise would be provided by the separator. Active material also can become embedded in the separator. This type of damage makes it more likely that the electrical potential of the cell will short circuit through the separator, instead of being discharged from the battery terminals.

In accordance with the subject invention, however, during assembly of the battery the separator is provided in a compressed state and the welding of the frame is performed while the separator remains in its compressed state. More specifically, the compressed thickness of the separator preferably is less than the predetermined spacing of the plates so that most, if not all contact between the separator and battery plates is avoided during vibrational welding. Since there is no contact with the plates, there will be little or no damage to the separator. Of course, relatively light contact between the separator and plate may cause little or no damage to the separator. In any event, the thickness of the compressed separator is sized such that damage to the separator which otherwise might occur during vibrational welding is reduced to an acceptable level.

Accordingly, in the illustrative battery 10 the separator 43 is made from a non-woven fabric comprising approximately 70–80% glass microfibers, the balance being polypropylene and polyethylene terephthalate microfibers which was commercially obtained from Bernard Dumas S.A., France (6000 series separator material available in various thicknesses). Separator material of this type is described in greater detail in French Published Spec. No. A1 2,677,672, which discloses in general separator material including glass microfibers and two kinds of synthetic fibers, the first preferably a polyester such as polyethylene terephthalate and the second a non-crystalline copolymer, wherein the two synthetic fibers have specified softening points so that high frequency welding of the separator material is facilitated.

Figure 7:
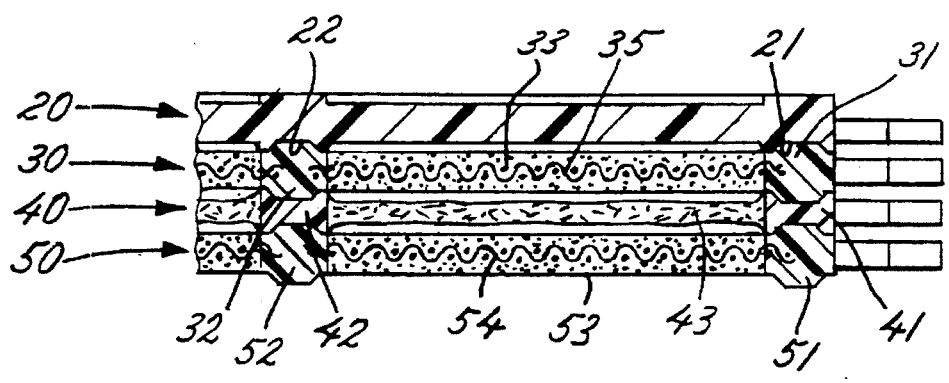
FIG. 7 is a cross-sectional view, taken generally along line 7–7 of FIGS. 3–6, of the frames shown in FIGS. 3–6, showing in particular those frames being arranged in a stacked, side-by-side manner, the separator therein being in its compressed state.

The distance between the battery plates 33, 53 in the finished frame assembly 16 is designed to be approximately 50 mil. Accordingly, the thickness of the separator 43 in its uncompressed state is approximately 60 mil, and in general will be from about 15 to about 30% thicker than the spacing between the battery plates. The separator 43, however, is compressed prior to vibration welding of the frames such that its thickness is less than the spacing which will be established between the battery plates, i.e., approximately 50 mil, as shown in FIG. 7.

More particularly, it has been observed that the material from which the separator 43 is fabricated will expand slightly within a relatively short period of time after the material is compressed. After this slight, initial expansion, however, the separator material will maintain its compressed state indefinitely. Accordingly, the separator 43 was initially compressed to a thickness of approximately 35 mil so that it assumed, after a short period of slight expansion, a compressed thickness of approximately 40 mil.

All welding of the frames 30, 40, 50 is done while the separator 43 remains in its compressed state. Thus, the thickness of the separator 43 in its compressed state and the spacing between the plates being coordinated as described above, there will be little or no contact between the separator 43 and the plates 33, 53 as the frames 30, 40, 50 are successively welded to each other. This absence of significant contact, in turn, essentially eliminates damage to the separator 43 which otherwise might occur during vibration welding.

Once the frame assembly 16 has been completed, and assembly of the battery has progressed to the point where electrolyte is added to the cell, it has been observed that the separator 43 tends to expand and to assume its uncompressed state in the presence of electrolyte. The thickness of the separator in its uncompressed state also being coordinated such that it is equal to or greater than the spacing between the plates, therefore, intimate contact is established and maintained between the separator 43 and the plates 33, 53.

The separator, as noted above, is composed of non-woven glass and synthetic microfibers. This material has been found to provide excellent performance, both in terms of the separator's function in the electrochemistry of the cell and in terms of facilitating manufacture of modular batteries in accordance with the subject invention. The material has low electrical resistance, high oxidation resistance, relatively high tensile strength, and can be heat-sealed. It also is sufficiently absorbent to hold the quantity of electrolyte necessary for the recombinant electrochemical charge and discharge of the cell.

It will be appreciated, however, that other types of separator material are known, including material composed exclusively of glass microfibers and material including glass microfibers and other polyester, polyolefin, or other synthetic microfibers. Those which have compressive characteristics similar to the Bernard-Dumas separator material are preferred. Other separator material may not maintain a compressed state for a period sufficiently long to allow for vibration welding of the frames. Such separator material, however, may be maintained in its compressed state by a releasable binder, and thus, used to advantage in the subject invention.

For example, separator material may be treated with a starch solution and dried under compression to maintain the separator in a compressed state. Once vibration welding is completed, and electrolyte is added to the battery, the electrolyte breaks down the starch and the separator is allowed to expand into contact with the plates. Other electrolyte-sensitive binders, i.e., binders which dissolve or otherwise lose their adhesive properties upon contact with electrolyte, may be used, so long as they or any reaction products, in the amounts present, do not interfere to an intolerable degree with the electrochemistry of the cell. Such binders, include, for example, other water soluble or dispersable binders such as polyvinyl alcohol, sugars, and lignins. Hot melts or solvent based adhesives which are broken down by electrolyte also could be applied to separator material for such purposes.

Binders which dissolve or otherwise lose their adhesive properties upon contact with heat, steam, solvents, or reagents, in addition to those released by electrolyte, also may be used. The releasable binder and the releasing agent should not interfere to an unreasonable degree with the electrochemistry of the cell. If a releasable binder will be used, however, electrolyte-sensitive binders are preferred because electrolyte will be added to the cell in any event.

The binder may be applied in a liquid solution or dispersion by spraying or soaking the separator material. The separator may be impregnated throughout with binder, but it should be appreciated that any binder in central portions of the separator may not lose its adhesive properties as readily as binder near the surface of the separator. If the residual binder interferes with expansion of the separator when electrolyte is added to the cell, it may be preferable to add binder only to the surface area of the separator, which can be reached easily by electrolyte or whatever agent will be used to release the binder. Alternately, the binder may be applied to limited areas of the separator, in a quilting fashion, if that is sufficient to maintain the compressed state of the separator during assembly and to permit expansion of the separator upon release of the binder and addition of electrolyte.

It also will be appreciated that separator material typically is lightweight and flexible. Application of a binder will generally stiffen the separator material and facilitate its handling during the assembly process, and use of a binder may be preferred for that reason.

The amount of binder added will vary somewhat depending primarily on the binder chosen and the resiliency of the separator material.

The separator may be mechanically compressed by any suitable means at various stages of assembly as desired. For example, sheets of separator material may be passed between a pair of opposing, spaced rollers. If the separator is to be supported on a frame, as shown in the illustrative battery 10, the compression of the separator can be performed prior to mounting it on the frame. The separator may be compressed after it is mounted on a frame, however, for example by suitably configured plates. If the separator is to be molded into a thermoplastic frame, as opposed to being adhered or otherwise secured to a prefabricated frame, the compression may be accomplished during the molding process. That is, the mold may be configured to provide opposing, spaced surfaces which will compress the separator as the mold is brought together to mold or frame, and because separate compression steps are thereby eliminated, this approach is preferred when it is not necessary to incorporate a binder in the separator material. If a binder is needed to maintain the separator material in a compressed state, however, it generally will be easier and more effective to treat and compress the separator material before mounting it in or on a frame.

Although this may be difficult or impractical if the separator will be compressed during molding of a frame, applicants have observed that the Bernard-Dumas separator material from which separator 43 is composed preferably is wetted with water during mechanical compression. It is believed that the water lubricates the fibers, resulting in less breaking of the fibers during compression and vibration welding, and also aids in maintaining the material in a compressed state. Accordingly, other liquids having a lubricating effect which are compatible with the electrochemistry of the cell also may be used.

It also will be appreciated that separator material may be obtained or produced which expands upon contact with electrolyte without having been subjected to a compression procedure, at least such a procedure which is identifiable or necessarily intended. This may result from compression which occurs during packaging or shipment of the material, or it may be inherent in the procedures used to manufacture the material. Since it is the thickness which the separator tends to assume in the presence of electrolyte in a completed battery which assures contact with the battery plates, and it is the diminished thickness of the separator which minimizes damage during vibration welding, however, such material, for purposes of the subject invention, is considered to have a "compressed" and "uncompressed" state even if there is no identifiable act of compression during production of the separator material or during assembly of the battery.

This invention has been disclosed and discussed primarily in terms of specific embodiments thereof, but it is not intended to be limited thereto. Other modifications and embodiments will be apparent to workers in the art.

We claim as our invention:

1. A method of fabricating a modular, recombinant lead-acid battery, the method comprising:

providing a plurality of thermoplastic frames, including at least two frames which support electrochemically active plates, the frames being adapted to be stacked and welded together such that the plates are spaced apart from each other a predetermined distance;

providing one or more separators, the separators having an uncompressed state, in which uncompressed state the separators have a thickness equal to or greater than the predetermined distance between plates, and a compressed state, the separators being provided in their compressed state;

successively stacking the frames and separators such that a separator is disposed between adjacent plates in its compressed state; and successively vibration welding the frames together while the separator is in its compressed state; the separator having a predetermined thickness in its compressed state effective to reduce abrasion of the separators by the plates during vibration welding and tending to assume its uncompressed state in the presence of electrolyte such that the separator contacts the plates.

2. The method of claim 1, wherein the separator has an uncompressed thickness greater than the predetermined distance between plates.

3. The method of claim 1, wherein the separator has a compressed thickness less than the predetermined distance spacing the plates.

4. The method of claim 2, wherein the separator has a compressed thickness less than the predetermined distance spacing the plates.

5. The method of claim 1, wherein the compressed separator includes a releasable binder maintaining the separator in its compressed state.

6. The method of claim 1, wherein the compressed separator includes an electrolyte-sensitive binder maintaining the separator in its compressed state.

7. The method of claim 6, wherein the binder is selected from the group consisting of starches, polyvinyl alcohol, sugars, and lignins.

8. The method of claim 1, wherein the compressed separator is provided by compressing a separator.

9. The method of claim 8, wherein the compressed separator is provided by compressing a separator in the presence of a lubricating liquid.

10. The method of claim 9, wherein the compressed separator is provided by compressing a separator in the presence of water.

11. The method of claim 1, which includes mounting the separator on a thermoplastic frame adapted to be stacked and welded between the plate-supporting frames.

12. The method of claim 11, which includes compressing the separator prior to mounting it on a separator-supporting frame.

13. The method of claim 12, which includes compressing the separator after mounting it on the separator-supporting frame.

14. The method of claim 12, wherein the method includes forming the separator-supporting frame by injection molding the separator-supporting frame in a mold, the mold being adapted to form the separator-supporting frame around the separator and to compress the separator during molding of the separator-supporting frame.

15. The method of claim 1, wherein the separator is a fibrous material composed of fibers selected from the group consisting of glass, polyester, and polyolefin fibers and mixtures of such fibers.

16. A battery made by the method of claim 1.

17. A battery made by the method of claim 2.

18. A battery made by the method of claim 3.

19. A battery made by the method of claim 6.

20. A method of fabricating a modular, recombinant lead-acid battery, the method comprising:

providing a plurality of thermoplastic frames, including at least two frames which support electrochemically active plates, the frames being adapted to be stacked and welded together such that the plates are spaced apart from each other a predetermined distance;

providing one or more fibrous separators essentially free of binders, the separators having an uncompressed state, in which uncompressed state the separators have a thickness equal to or greater than the predetermined distance between plates, and a compressed state, the separators being provided in their compressed state;

successively stacking the frames and separators such that a separator is disposed between adjacent plates in its compressed state; and successively vibration welding the frames together while the separator is in its compressed state; the separator having a predetermined thickness in its compressed state effective to reduce abrasion of the separators by the plates during vibration welding and tending to assume its uncompressed state in the presence of electrolyte such that the separator contacts the plates.

21. The method of claim 20, wherein the compressed separator is provided by compressing a separator.

22. The method of claim 21, wherein the compressed separator is provided by compressing a separator in the presence of a lubricating liquid.

23. The method of claim 22, wherein the compressed separator is provided by compressing a separator in the presence of water.

* * * * *

UNITED STATES PATENT AND TRADEMARK OFFICE
CERTIFICATE OF CORRECTION

PATENT NO. : 5,512,065
DATED : April 30, 1996
INVENTOR(S) : Kump et al.

It is certified that error appears in the above-indentified patent and that said Letters Patent is hereby corrected as shown below:

Column 4, line 51, after "assembly" insert --16--.

Column 4, lines 51-52, after "pair of end frames" insert --20--.

Column 5, line 33, after "plate" insert --frames--.

Column 7, line 58, after "greater detail" insert --the English language abstract of--.

Signed and Sealed this

Twenty-fourth Day of December, 1996

Attest:

BRUCE LEHMAN

Attesting Officer     Commissioner of Patents and Trademarks